3,205,194
IMIDAZOLIDINE THIONE HYDROCHLORIC
ACID SALTS AS STABILIZERS
Arthur E. Oberster, North Canton, and Wendell S. Cook, Canal Fulton, Ohio, assignors to The Firestone Tire & Rubber Company, Akron, Ohio, a corporation of Ohio
No Drawing. Filed Jan. 2, 1962, Ser. No. 163,896
11 Claims. (Cl. 260—45.8)

This invention relates to the use of imidazolidine thione hydrochloric acid salts as stabilizers for polymers and their vulcanizates. It includes the stabilizer polymers and vulcanizates as well as their preparation.

Various derivatives of imidazolidine-4-thiones are known in the literature.

Salts of 7,14-diazadispiro-[5.1.5.2]-pentadecane-15-thione and lower alkyl derivatives thereof substituted on methylene groups which are connected to two other methylene groups, and particularly the hydrochloric acid salts re stabilizers of diene elastomer emulsion polymers composed of a substantial portion of hydrocarbon diene polymer (for example, butadiene rubbers, styrene-butadiene rubbers, nitrile-butadiene rubbers, acrylate-butadiene rubbers, isoprene rubbers (synthetic)) and their vulcanizates. The polymers and their vulcanizates are prepared in any usual manner, and the stabilizer is added at a convenient stage, preferably just prior to coagulation of the polymer or polymers.

The solubility of the salts in water varies over a considerable range. The relative solubility order of these salts is as follows:

The least soluble are given first, and the most soluble last. The hydrochloric acid salts have substantially the same solubility in water as that of the parent compound 7,14-diazadispiro-[5.1.5.2]-pentadecane-15-thione. They are less soluble than the sulfuric acid and nitric acid salts which have about the same solubility. These latter are less soluble than the phosphoric acid salt.

This solubility order may explain the relative activities of these materials in polymers and rubbers. The solubility of any of these salts can be altered by adding solutes to the water, and non-aqueous solvents may be utilized for this purpose.

The stabilizers of this invention include more particularly the hydrochloric acid salts of compounds of which the following are illustrative:

3,11-dimethyl-7,14-diazadispiro-[5.1.5.2]-pentadecane-15-thione
3,11-di-t-butyl-7,14-diazadispiro-[5.1.5.2]-pentadecane-15-thione
3,11-di-t-amyl-7,14-diazadispiro-[5.1.5.2]-pentadecane-15-thione
3,11-di-n-butyl-7,14-diazadispiro-[5.1.5.2]-pentadecane-15-thione
2,10-dimethyl-7,14-diazadispiro-[5.1.5.2]-pentadecane-15-thione
2,10-di-n-butyl-7,14-diazadispiro-[5.1.5.2]-pentadecane-15-thione
2,10-di-tt-octyl-7,14-diazadispiro-[5.1.5.2]-pentadecane-15-thione
3,11-dicyclohexyl-7,14-diazadispiro-[5.1.5.2]-pentadecane-15-thione
3,11-diisopropyl-7,14-diazadispiro-[5.1.5.2]-pentadecane-15-thione
2,10-diethyl-7,14-diazadispiro-[5.1.5.2]-pentadecane-15-thione
2,4,10,12-tetramethyl-7,14-diazadispiro-[5.1.5.2]-pentadecane-15-thione
2,3,10,11-tetraethyl-7,14-diazadispiro-[5.1.5.2]-pentadecane-15-thione The following example illustrates the preparation of the use of the hydrochloric acid salts. The high concentrations in water required to add the more water-soluble salts to the polymer in latex form make their use commercially impractical because of the expense. The example illustrates the use of the salts as stabilizers in SBR, styrene-butadiene polymer rubber. They can likewise be used in the stabilization of other emulsion polymers of diene elastomers. The salts are non-staining and polymers containing them age with substantially no discoloration.

The following example illustrates the preparation of the hydrochloric acid salt which is useful as stabilizer. The parent compound, 7,14-diazadispiro-[5.1.5.2]-pentadecane-15-thione has the following formula:

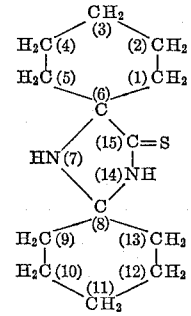

The example follows:

EXAMPLE

*Hydrochloric acid salt of 7,14-diazadispiro-[5.1.5.2]-pentadecane-15-thione*

The parent compound (60 grams) was suspended in a mixture of 100 ml. of concentrated hydrochloric acid and 300 ml. of water. This suspension was stirred vigorously for two hours. The reaction mixture was filtered, the product was washed with cold water and allowed to dry on the filter. This resulted in 67 grams of product melting at 275° C. (d.)

In the following tables comparison has been made with a widely used commercial stabilizer for SBR polymer which is identified as Stabilizer I, and this and a stabilizer of this invention were tested and compared with the parent compound, these latter stabilizers being identified in the following tables as:

Stabilizer A=hydrochloric acid salt of 7,14-diazadispiro-[5.1.5.2]-pentadecane-15-thione.
Stabilizer B=The parent compound 7,14-diazadispiro-[5.1.5.2]-pentadecane-15-thione.

In the tests 1.25 parts of Stabilizer I per 100 parts of SBR were employed, and for the imidazolidine thione stabilizers only 0.5 part per 100 parts of SBR. The stabilizers were added to the SBR latexes prior to coagulation.

In Table I, the effects of oven aging SBR polymer containing stabilizers of this invention and the commercial stabilizer are compared before and after aging four days in an air circulating oven at 70° C.

TABLE I

|  | Surface Rating | | Mooney Viscosity | |
| --- | --- | --- | --- | --- |
|  | Orig. | 4 Days | Orig. | 4 Days |
| Polymer + Stabilizer A | OK | OK | 53.0 | 52.0 |
| Polymer + Stabilizer B | OK | OK | 53.5 | 55.5 |
| Polymer + Stabilizer I | OK | OK | 48.0 | 49.0 |

Table II shows the normal and aged physical properties of vulcanizates obtained from SBR polymer containing Stabilizers A, B, and I, respectively, in the different amounts previously described when compounded as indicated in the heading of the table. The various stocks were cured for 30 minutes at 300° F.

TABLE II

|  | A | I | B |
|---|---|---|---|
| Polymer + Stabilizer A | 100 | | |
| Polymer + Stabilizer I | | 100 | |
| Polymer + Stabilizer B | | | 100 |
| HAF Black | 50 | | |
| Oil | 8 | | |
| Stearic Acid | 1.5 | | |
| Zinc Oxide | 3.0 | | |
| Accelerator | 1.0 | | |
| Sulfur | 1.75 | | |
| Total | 165.25 | 165.25 | 165.25 |
| Normal Stress-Strain: | | | |
| 300% Modulus, p.s.i | 2,025 | 2,200 | 2,000 |
| Tensile, p.s.i | 3,150 | 2,250 | 3,050 |
| Elongation, percent | 420 | 410 | 410 |
| Aged 2 days at 212° F.—Oven: | | | |
| 200% Modulus, p.s.i | 2,575 | | |
| Tensile, p.s.i | 2,650 | 2,575 | 2,500 |
| Elongation, percent | 200 | 190 | 190 |
| Aged 5 Hours at 260° F.—Air Bomb: | | | |
| 200% Modulus, p.s.i | | | |
| Tensile, p.s.i | 1,000 | 825 | 650 |
| Elongation, percent | 90 | 80 | 70 |

The results show that the stabilizer of this invention, the parent compound from which it was formed, and the commercial stabilizer all are effective in stabilizing the vulcanizate.

It is to be noted that in the various tests the amount of the commercial stabilizer was 2.5 times that of the stabilizer of this invention.

The examples are illustrative. The amount of stabilizer used will in general be between 0.1 and 10 parts per hundred parts of the polymer or vulcanizate, by weight.

What we claim is:

1. The method of stabilizing elastomer emulsion polymer composed of a substantial portion of hydrocarbon diene polymer which comprises adding to an emulsion of the polymer before coagulation a stabilizing amount of the hydrochloric acid salts of imidazolidine thiones of the formula

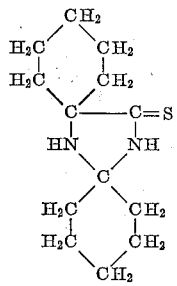

and lower alkyl derivatives thereof substituted on methylene groups which are connected to two other methylene groups, thereafter coagulating the emulsion and thereby incorporating stabilizer in the polymer, and then subjecting the resulting polymer composition to heat aging.

2. The method of claim 1 in which the polymer is styrene-butadiene rubber polymer.

3. The method of claim 1 in which the polymer is styrene-butadiene rubber polymer and the stabilizer is the hydrochloric acid salt of unsubstituted imidazolidine thione.

4. The method of stabilizing the vulcanizate of an elastomer emulsion polymer composed of a substantial portion of hydrocarbon diene polymer which comprises vulcanizing the same in the presence of a stabilizing amount of the hydrochloric acid salt of an imidazolidine thione of the formula

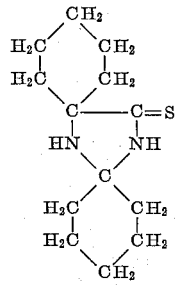

and lower alkyl derivatives thereof substituted on methylene groups which are connected to two other methylene groups.

5. The method of claim 1 in which the vulcanizate is styrene-butadiene rubber vulcanizate.

6. The method of claim 1 in which the vulcanizate is styrene-butadiene rubber vulcanizate and the stabilizer is the hydrochloric acid salt of unsubstituted imidazolidine thione.

7. A product of the class consisting of elastomer emulsion polymers composed of a substantial portion of hydrocarbon diene polymer and vulcanizates thereof stabilized with the hydrochloric acid salt of an imidazolidine thione of the formula

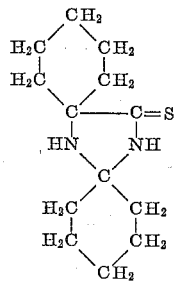

and lower alkyl derivatives thereof substituted on methylene groups which are connected to two other methylene groups.

8. The product of claim 7 in which the product is a polymer.

9. The product of claim 8 in which the polymer is styrene-butadiene rubber polymer.

10. The product of claim 7 in which the product is a vulcanizate.

11. The product of claim 7 in which the stabilizer is hydrochloric acid salt of unsubstituted imidazolidine thione.

References Cited by the Examiner

UNITED STATES PATENTS

| 2,785,175 | 3/57 | Christian | 260—309.7 |
| 2,806,036 | 9/57 | Christian | 260—309.7 |
| 2,842,553 | 7/58 | Christian | 260—309.7 |

LEON J. BERCOVITZ, *Primary Examiner.*

JOSEPH R. LIBERMAN, *Examiner.*